(12) United States Patent
Light et al.

(10) Patent No.: US 6,384,820 B2
(45) Date of Patent: *May 7, 2002

(54) METHOD AND APPARATUS FOR AUTOMATED DYNAMICS OF THREE-DIMENSIONAL GRAPHICS SCENES FOR ENHANCED 3D VISUALIZATION

(75) Inventors: John J. Light, Hillsboro; John David Miller, Beaverton, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,151

(22) Filed: Dec. 24, 1997

(51) Int. Cl.[7] ................................................. G06T 15/00
(52) U.S. Cl. ....................................................... 345/419
(58) Field of Search ................................. 345/433, 419, 345/421, 422, 426, 427, 440, 441

(56) References Cited

U.S. PATENT DOCUMENTS

| 4,600,917 A | * | 7/1986 | Shen ........................... 340/729 |
| 5,267,154 A | | 11/1993 | Takeuchi et al. |
| 5,566,280 A | | 10/1996 | Fukui et al. |
| 5,706,417 A | | 1/1998 | Adelson |
| 5,710,875 A | | 1/1998 | Harashima et al. |

* cited by examiner

*Primary Examiner*—Phu K. Nguyen
(74) *Attorney, Agent, or Firm*—Blakely, Sokoloff, Taylor & Zafman LLP (57) ABSTRACT

A method and apparatus to enhance the visualization of a 3D graphics scene. A first 3D view of the graphics scene is generated from a first viewing position and a second 3D view of the graphics scene is generated from a second viewing position. The two views are then displayed alternately to produce a "shaking" effect to enhance the 3D visualization.

27 Claims, 5 Drawing Sheets

*FIG. 5A* — HORIZONTAL MOTION

*FIG. 5B* — VERTICAL MOTION

*FIG. 5C* — CIRCULAR MOTION

FIG. 6

METHOD AND APPARATUS FOR AUTOMATED DYNAMICS OF THREE-DIMENSIONAL GRAPHICS SCENES FOR ENHANCED 3D VISUALIZATION

BACKGROUND OF THE INVENTION

1. Field of the Invention

The present invention relates generally to computer graphics applications, and, more particularly, to a method and apparatus for automated dynamics of three-dimensional graphics scenes for enhanced 3D visualization by a user.

2. Description of the Related Art

Three-dimensional graphics technology has experienced explosive growth over the past several years. A significant contribution to this growth has been its adaptability to a wide spectrum of applications, not to mention the numerous advantages it provides over 2D.

Currently, 3D graphics technology is used extensively in design-related applications, such as architecture and engineering. It is also being used in scientific investigations, such as the re-creation of airplane crash disasters, and, in recreational-type activities, such as computer games, to name a few. The sophistication of these graphics afford an individual a realistic perspective of how various objects appear (and perhaps even dynamically inter-relate) in a virtual setting, thus providing an indispensable tool to a user of such graphics.

Currently, one significant problem encountered with 3D graphics is the user's inability to properly interpret the relative depths of objects in 3D scenes (i.e., depth perception). This is primarily caused by the 3D graphics being projected onto a flat, two-dimensional computer screen, which severely limits the user's perception of this third dimension of 3D. As a result, the user cannot fully realize, and, thus appreciate, the depth of a 3D scene that makes these graphics more realistic or life-like.

In the real world, depth perception is typically facilitated by movements that are sub-consciously performed by an individual, whether it be a subtle shift of the individual's body, head, or eyes. Such movements by the individual are commonly known as relative motion. However, although these subtle movements by the individual work in the real world for providing a better understanding of depth, such movements will not facilitate depth perception on conventional computer screens because the screens themselves are two-dimensional.

In an attempt to overcome this difficulty in perceiving depth, a computer user will often change the orientation of a 3D graphics scene (e.g., by navigation) to gain the benefits of relative motion as experienced in the real world. However, this action inconveniences the user by placing the burden on him or her to provide such motion, especially if the user desires to remain static in the 3D scene to study a particular object. Moreover, while the user is trying to better interpret the 3D scene by engaging in navigation, he or she is distracted by concentrating more on the navigation process itself. That is, navigation requires the user to perform conscious acts (via a user-input device, for example) to provide this movement and is not sub-consciously performed, as relative motion is performed in the real world.

Typically, 3D graphics applications are designed with a variety of features to attempt to improve 3D simulation on a flat computer screen. These features include occlusion, shading, fog, size gradients, among others. However, although these features may improve depth perception in 3D scenes to some degree, they do not provide the user with a complete concept of depth in a quantitative manner, which is typically satisfied by relative motion in the real world.

A good form of relative motion is the full duplication of the natural vision environment by providing a true 3D display. Such a display would permit the user to perform his or her natural psychomotor abilities (i.e., body, head, and eye movement) to obtain the relative motion necessary to properly interpret a 3D scene. However, while these displays have been prototyped, their widespread use in the near future is unlikely. Furthermore, if and when these displays do become available, their cost is expected to be quite lofty, thus placing these displays out of the general public's reach from a monetary standpoint.

The present invention is directed to overcoming, or at least reducing the effects of, one or more of the problems set forth above.

SUMMARY OF THE INVENTION

In one aspect of the present invention, a method is provided for enhancing the visualization of three-dimensional computer graphics scenes. The method includes generating a first 3D graphics scene representing a first viewing position of a 3D coordinate space; generating a second 3D graphics scene representing a second viewing position of the 3D coordinate space, with the second viewing position being a first distance from the first viewing position; and alternately displaying the first and second 3D graphics scenes.

In another aspect of the present invention, an apparatus includes a processor adapted to generate a 3D graphics scene representing a first viewing position of a 3D coordinate space, and to change to a second viewing position of the 3D coordinate space. The first and second viewing positions are spaced apart by a first distance. The apparatus further includes a display for displaying the first and second viewing positions, where the processor is further adapted to shift repetitively between the first and second viewing positions.

In another aspect of the present invention, a method is provided enhancing the visualization of three-dimensional computer graphics scenes. The method includes determining a first viewing position and a second viewing position to be assumed by a virtual camera in a 3D coordinate space, where the first and second viewing positions are separated by a first distance; and generating a series of 3D graphics scenes by the continuous movement of the virtual camera oscillating between the first and second viewing positions.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Figure 1:
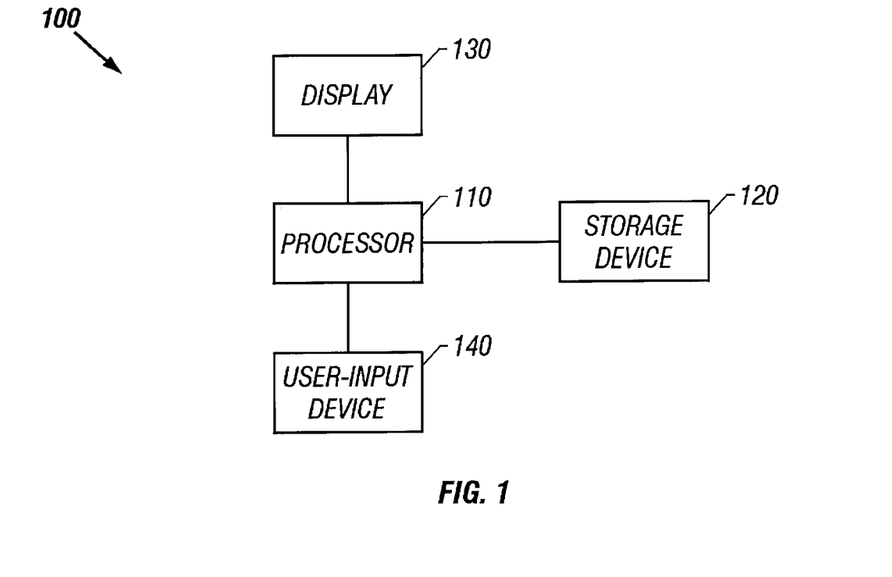
FIG. 1 is a block diagram of an apparatus for providing enhanced 3D visualization of a three-dimensional graphics scene in accordance with the present invention.

Turning now to the drawings, and specifically referring to FIG. 1, an apparatus 100 for generating three-dimensional graphics scenes and for enhancing the 3D visualization of these scenes is shown. The apparatus 100 comprises a processor 110, which renders the three-dimensional graphic scenes based upon a set of instructions from a computer graphics application stored in a storage device 120, such as a disk drive, CD-ROM drive, hard drive, etc. In one embodiment, the apparatus 100 may take the form of a conventional personal computer (PC). The specific process by which the processor 110 renders these three-dimensional graphics scenes is well known to those of ordinary skill in the art. Accordingly, the specifics of such process will not be discussed herein to avoid obscuring the invention.

Once a particular three-dimensional graphics scene is rendered, the processor 110 displays the 3D scene on a display 130 for visual presentation to a user. The apparatus 100 further includes a user-input device 140, which permits the user to navigate throughout the three-dimensional graphics scene and to select various options available to the user from the computer graphics application. In the illustrated embodiment, the user-input device 140 is a computer mouse. However, it will be appreciated that the user-input device 140 could be embodied as various other types of input devices, such as, for example, a trackball, touchpad, tablet, keyboard, touchscreen, joystick, etc. without departing from the spirit and scope of the present invention. It will also be appreciated that the user-input device 140 could also be embodied as a combination of some of the aforementioned input devices.

Figure 2:
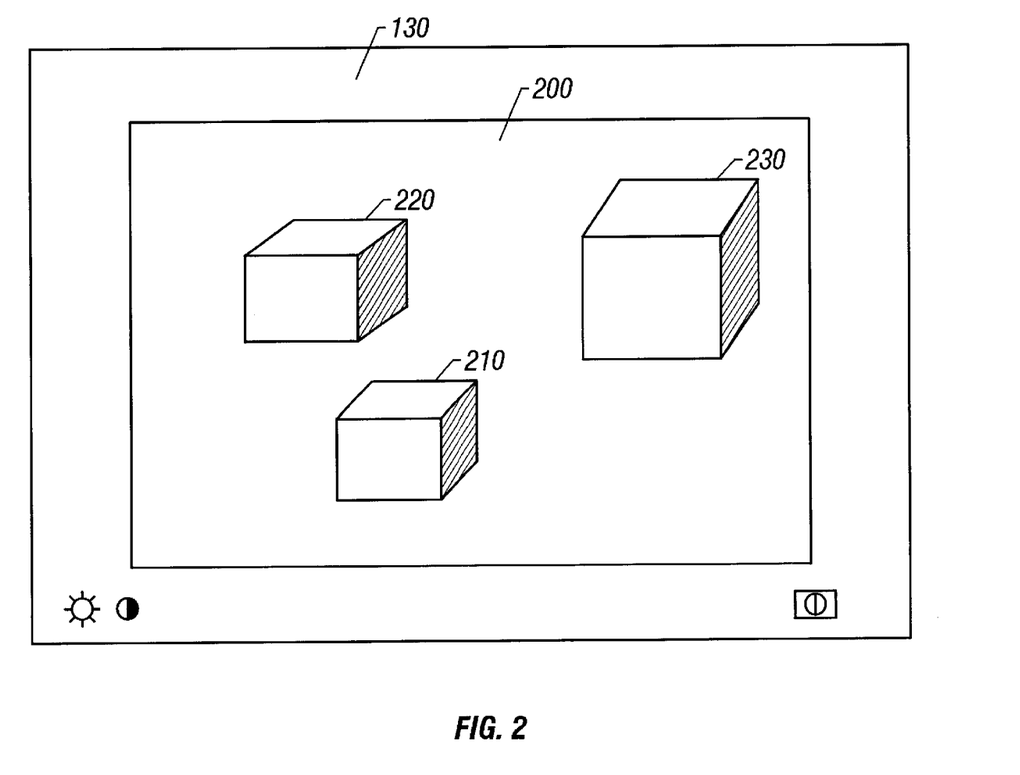
FIG. 2 is a generic representation of a three-dimensional graphics scene shown on a display of the apparatus of FIG. 1.

Turning now to FIG. 2, a generic three-dimensional graphics scene 200 that is rendered by the processor 110 is shown on the display 130. The 3D scene 200 includes a plurality of 3D objects 210–230, which could represent a myriad of items. For example, the 3D scene 200 may represent a room of a house and the 3D objects 210–230 may be various pieces of furniture within the room. Of course, this particular example is for illustration purposes only, and the 3D scene 200, as well as the 3D objects 210–230 present therein, could represent virtually anything. It should further be noted that the 3D scene 200 could comprise any number of objects and not necessarily be limited to the three objects 210–230 as shown.

The 3D scene 200 creates a realistic perspective of a 3D space (for example, the room of a house) and gives the user the impression that he or she is actually present within the 3D space, even though in reality he or she is not. Essentially, the 3D scene 200 is what the user would see through his or her own eyes when assuming a particular viewing position within the 3D space.

While being viewed from the perspective of the 3D scene 200, the 3D space is projected onto a flat, two-dimensional surface on the display 130. As a result of this two-dimensional projection, the third dimension of the 3D space (i.e., depth) is not adequately represented, and, thus, not properly conveyed in a visual manner to the user. Accordingly, while viewing the 3D scene 200, the relative depths of the objects 210–230 within the 3D space will not be apparent when the user remains in a static position within such space.

Figure 3:
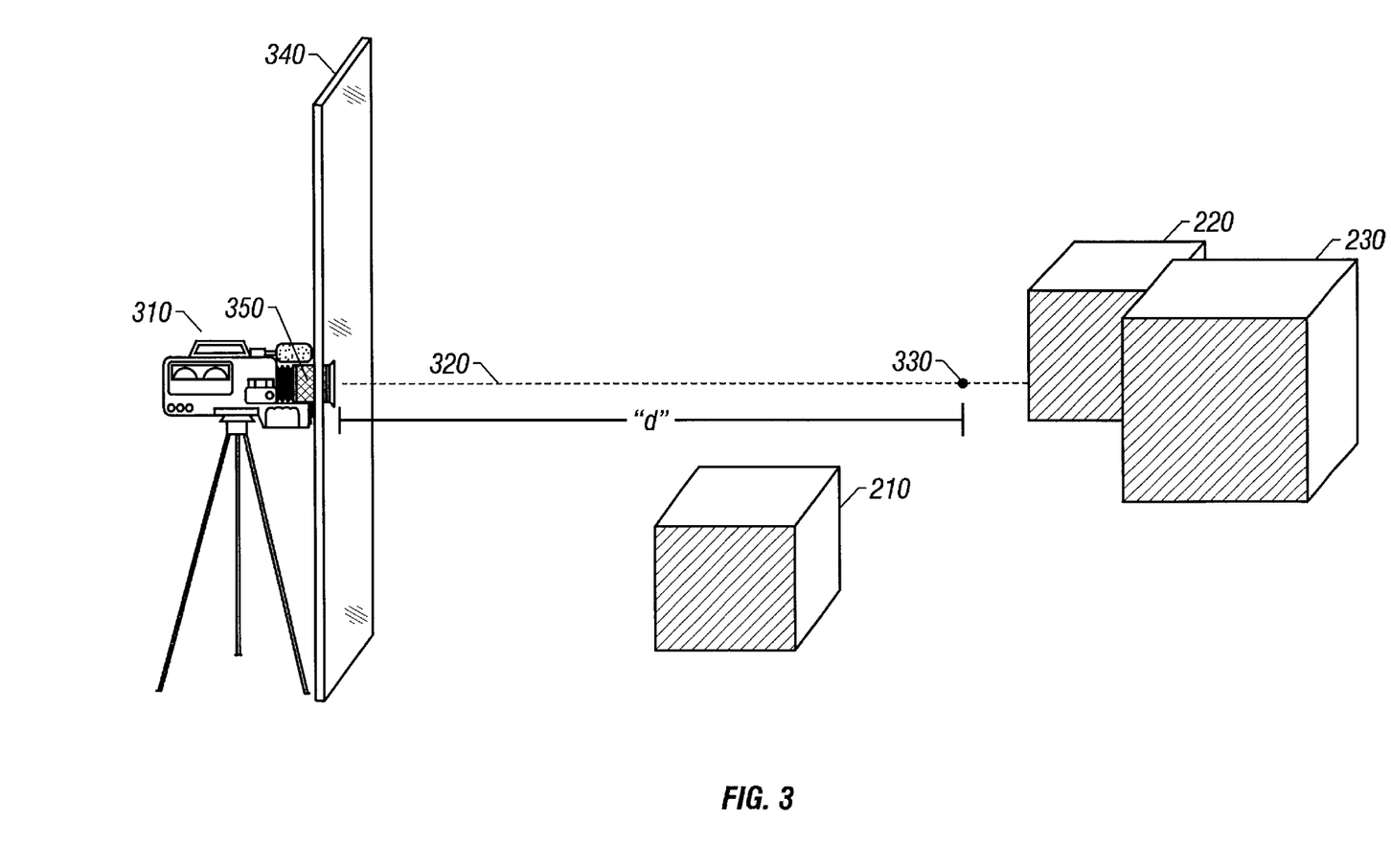
FIG. 3 is a side view perspective of a 3D space depicting the manner in which the three-dimensional graphics scene of FIG. 2 is obtained.

The manner in which the 3D scene 200 of FIG. 2 is obtained is shown in FIG. 3, which provides a side view perspective of the 3D space containing the objects 210–230. As shown in FIG. 3, a "virtual" camera 310 views the 3D space in the direction of an eye line 320, providing the user with the viewing perspective as shown in the 3D scene 200 of FIG. 2. With this alternative perspective as shown in FIG. 3, it is easier to ascertain the relative depths of the objects 210–230 within the 3D space, especially when viewed vis-à-vis the perspective of FIG. 2. Thus, to alleviate any uncertainty of depth perception, the user will typically navigate the 3D space via the user-input device 140, causing the camera 310 to obtain different visual perspectives within the space. Such navigation is performed by the processor 110 using traditional navigation methods that are well established in the art. As the user navigates within the 3D space, he or she can more accurately assess the relative depths of the objects 210–230, thus obtaining a truer 3D visualization of the space.

As the user navigates to obtain a better perspective of the 3D space, he or she tends to concentrate more on the navigation process itself as opposed to the objects 210–230 present therein. Thus, to reduce the effects of this distraction on the user, a technique for providing automated dynamics (i.e., subtle motion) of the 3D scene 200 is employed. Such motion of the scene 200 is essentially accomplished by "shaking" the virtual camera 310, which will effectively simulate the effects of relative motion (as experienced in the real world for improved depth perception). Accordingly, by providing such automated dynamics of the 3D scene 200, the user need not be encumbered by traditional navigational methods to obtain a truer 3D visualization of the objects 210–230 present within the scene 200.

Figure 4:
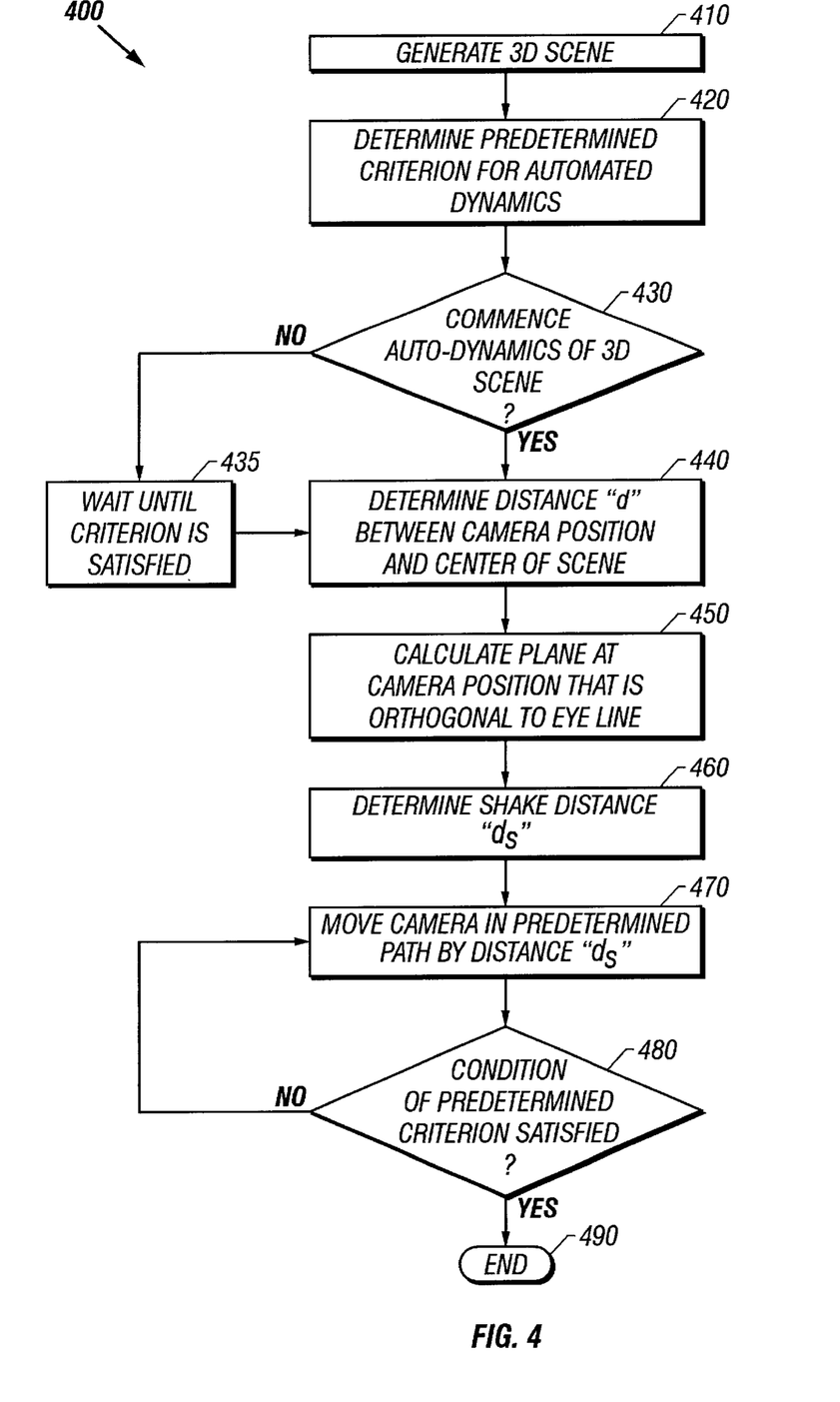
FIG. 4 is a flowchart depicting one embodiment of a process executed by the apparatus of FIG. 1 for providing enhanced 3D visualization of the three-dimensional graphics scene of FIG. 2.

Referring to FIG. 4, a process 400 executed by the processor 110 for enhancing the 3D visualization of the graphics scene 200, by using such automated dynamics technique, is shown. The process 400 commences at step 410, where the processor 110 generates the 3D graphics scene 200 based upon instructions from a computer graphics application running thereon. At step 420, it is determined what type of predetermined criterion has been set by the user for starting the automated dynamics of the generated 3D scene 200. For example, the user may have previously defined the predetermined criterion to provide continuous auto-dynamics of the 3D scene 200 without any further interaction required by the user. Alternatively, the user could designate to provide continuous auto-dynamics until a predetermined input is received via the user-input device 140, in which case, the auto-dynamics of the 3D scene 200 would cease. The user could also cause the auto-dynamics of the scene 200 to commence upon receiving a predetermined input via the user-input device 140, such as, by merely touching a key on a keyboard or clicking a mouse button, for example. The user could further define the predetermined criterion such that the auto-dynamics of the 3D scene 200 begins subsequent to a navigation step performed by the user. Such criterion could also be defined such that the auto-dynamics of the 3D scene 200 would continuously occur until a predetermined time period expires.

The predetermined criterion could also be a combination of some of the aforementioned criteria. For example, subsequent to receiving an input from the user to initiate the auto-dynamics, such auto-dynamics of the scene 200 may cease after a predetermined time period elapses (e.g., 5 seconds). The manner in which the user could define such predetermined criterion could be, for example, via a "drop" menu from the computer graphics application that generates the 3D scene 200, where the user would select the desired criterion via the user-input device 140. Alternatively, such criterion could be previously designated by the computer graphics application designer, without any option to the user.

Subsequent to determining the type of predetermined criterion, it is determined at step 430 whether or not to commence the auto-dynamics of the scene 200 based upon the condition as set forth by the predetermined criterion in step 420. That is, if the predetermined criterion was defined to have the auto-dynamics run continuously, the auto-dynamics of the 3D scene 200 would commence without any interaction by the user. If, however, the predetermined criterion required some interaction by the user, such as, pressing a key on a keyboard, for example, the auto-dynamics of the 3D scene 200 would commence upon that occurrence.

If it has been determined that the predetermined criterion for starting the auto-dynamics has not occurred, the processor 110 will wait until such criterion is satisfied at step 435 until proceeding to step 440. However, if it has been determined that such criterion has been satisfied for starting the auto-dynamics, the process 400 proceeds directly to step 440, where the processor 110 determines a distance "d" between the virtual camera 310 and an approximate center of the 3D scene 200.

Referring back to FIG. 3, a point 330 (residing on the eye line 320) signifies the approximate center for the 3D scene 200. The manner in which this distance "d" along the eye line 320 between the virtual camera 310 and the center point 330 is determined, as well as the location of the center point 330 itself, is well known to those of ordinary skill in the art and will not be discussed herein to avoid obscuring the invention. Subsequent to determining the distance "d" between the virtual camera 310 and center point 330, a plane 340 (FIG. 3) that is orthogonal to the eye line 320 is calculated at step 450. The lens 350 of the virtual camera 310 rests on, and is orthogonal to, the plane 340. Although the plane 340 is shown to have finite dimensions in FIG. 3, this is merely for illustration purposes only. The plane 340 actually extends infinitely on all four sides.

Returning to FIG. 4, the process 400 continues to step 460, where a "shake" distance "$d_s$" is calculated as a small fraction of the distance "d" obtained in step 440. For example, the distance "$d_s$" would be typically less than five percent of the distance "d", such as one-one-hundredth (i.e., $\frac{1}{100}$) of the distance "d". However, it will be appreciated that the distance "$d_s$" could alternatively be any other fraction of the distance "d" and not necessarily limited to less than 5%. This distance "$d_s$" determines by how much the virtual camera 310 will move on the plane 340 to effectively "shake" the 3D scene 200 of FIG. 2 to provide a more accurate representation of the depths of the objects 210–230 present therein.

Because the distance "$d_s$" is a fraction of the distance "d" between the virtual camera 310 and the center point 330 of the scene 200, the camera 310 will move an appropriate distance to allow for adequate depth perception of the objects 210–230 within the scene 200. As an alternative to obtaining the "shake" distance "$d_s$" as a fraction of the distance "d", such distance "$d_s$" could be determined by some other criterion or could be designated as a fixed value, if so desired.

The process 400 continues to step 470, where the virtual camera 310 is moved by the distance "$d_s$" (or by a factor of "$d_s$", e.g., twice "$d_s$") in a predetermined path (which will be described later) on the surface of the plane 340. While the camera 310 performs this movement, it remains orthogonal to the plane 340. Subsequent to moving the camera 310 in the predetermined path, it is determined if the predetermined criterion (as set forth in step 420) has been satisfied in step 480. For example, if the predetermined criterion was to perform the auto-dynamics for a predetermined time period of 5 seconds, for example, the process 400 would then end at step 490 upon expiration of the 5 second time interval. However, if the predetermined time period had not been satisfied, the process 400 would then revert back to step 470 for continued movement of the camera 310 in the predetermined path until the time period has expired. If the predetermined criterion had been set to run the auto-dynamics continuously, satisfying this condition in step 480 may be the change to a completely new 3D scene, where the process 400 would end at step 490 and would subsequently re-start again at step 410.

Figure 5A:
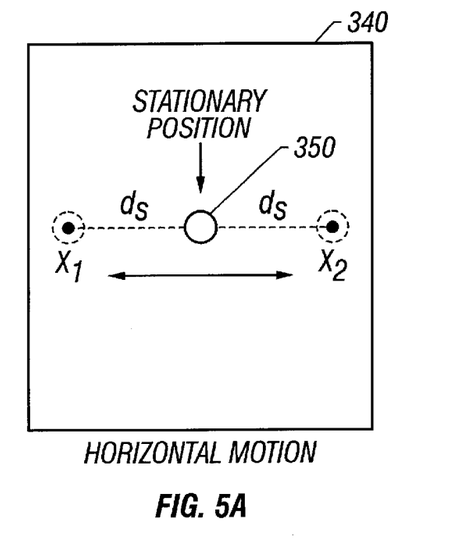
FIGS. 5A–C show different types of paths followed by a virtual camera on a plane for providing auto-dynamics of the 3D graphics scene of FIG. 2.
Figure 5B:
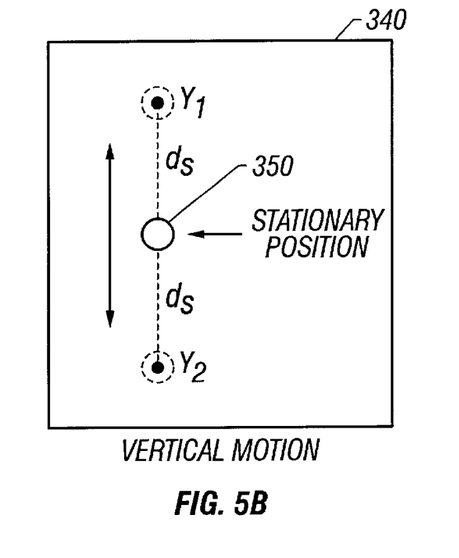
Figure 5C:
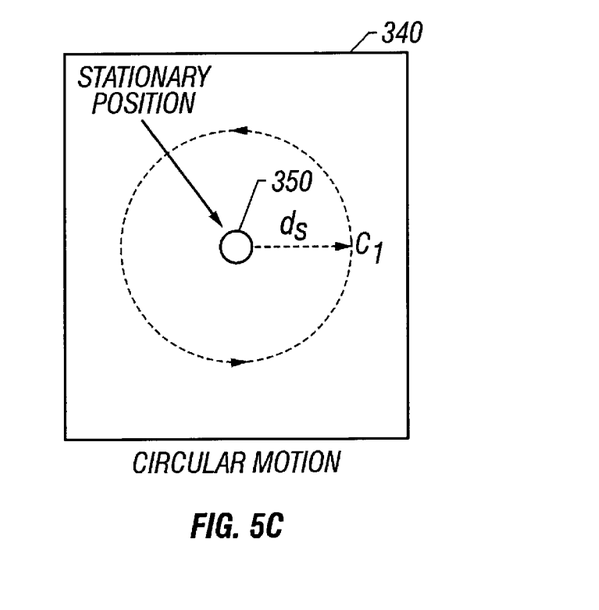

Referring to FIGS. 5A–C, a plurality of different types of paths that could be followed by the virtual camera 310 along the plane 340 are shown. Specifically, in FIG. 5A, the camera lens 350 moves horizontally (i.e., laterally) between the viewing positions of points $x_1$ and $x_2$ in a linear path. That is, the lens 350 of the camera 310 moves from its stationary viewing position to the viewing position $x_1$, which has a separation distance "$d_s$" from the stationary viewing position. The lens 350 then, while remaining orthogonal to the plane 340, moves from the viewing position $x_1$ to the viewing position $x_2$, and, essentially oscillates between these two viewing positions $x_1$ and $x_2$ until the predetermined criterion has been satisfied.

In one embodiment, when the camera 310 is at the viewing position $x_1$, the processor 110 will essentially generate a new 3D scene on the display 130, although, the user will most likely not notice the subtle difference between the 3D scene of the stationary viewing position and that of the viewing position at $x_1$. Subsequently, when the camera 310 arrives at the viewing position of $x_2$, the processor generates another 3D scene. And, the camera 310 will shift repetitively between the two viewing positions $x_1$ and $x_2$ and alternately display the two graphic scenes generated at each viewing position $x_1$ and $x_2$. The repetitive shift between the two viewing positions of $x_1$ and $x_2$ will be subtle enough so as not to interfere with the user's understanding of the scene 200, but the user will indeed benefit from such movement with improved depth perception of the objects 210–230 within the scene 200.

In an alternative embodiment, the processor 110 could animate the movement of the camera 310 between the viewing positions of $x_1$ and $x_2$ by generating multiple 3D scenes along the path between these viewing positions. That is, the camera 310 would assume multiple viewing positions within the 3D space while moving back and forth between these points of $x_1$ and $x_2$. Such animation would provide the user with a smoother transition between the viewing positions of $x_1$ and $x_2$, while also improving depth perception of the object 210–230 within the scene 200. The process for accomplishing animation in 3D scenes is well established in the art of computer graphics, and a detailed description of such can be found in "Open GL Programming for Windows 95 and Windows NT", by Ron Fosner, Addison-Wesley Developers Press, 1996, the entire contents of which is incorporated herein by reference.

As an alternative to horizontal movement, the camera lens 350 could "shake" vertically in a linear motion by oscillating between the viewing positions $y_1$ and $y_2$ as shown in FIG. 5B. This movement could be accomplished by either of the aforementioned embodiments, i.e., the generation of two 3D scenes at each of the viewing positions $y_1$ and $y_2$ and the repetitive shift between such points or, alternatively, by the animation of the camera 310 between these points.

In another embodiment, the camera lens 350 could follow a circular pattern as shown in FIG. 5C. In this particular embodiment, the camera 310 would animate by generating multiple 3D scenes from the stationary viewing position to a viewing position $c_1$, which is separated from the stationary viewing position by the distance "$d_s$". The camera 310 could then animate while "circling" the stationary viewing point at the separation distance "$d_s$" as shown in FIG. 5C.

The particular path taken by the camera 310 could be selected depending on which path would provide the optimal depth perception to the user for a particular 3D graphics scene. As opposed to using just one of the paths, a combination of the paths of FIGS. 5A–C could be used by the camera 310 in a single "shaking" session. That is, the camera 310 may initially "shake" in a horizontal motion for a couple of seconds and then shake in a vertical motion for a couple of seconds, and so on. The path to be taken by the camera 310 could be selected by options available to the user through a "pull down" menu, for example, or could be designated by the computer graphics application designer.

Figure 6:
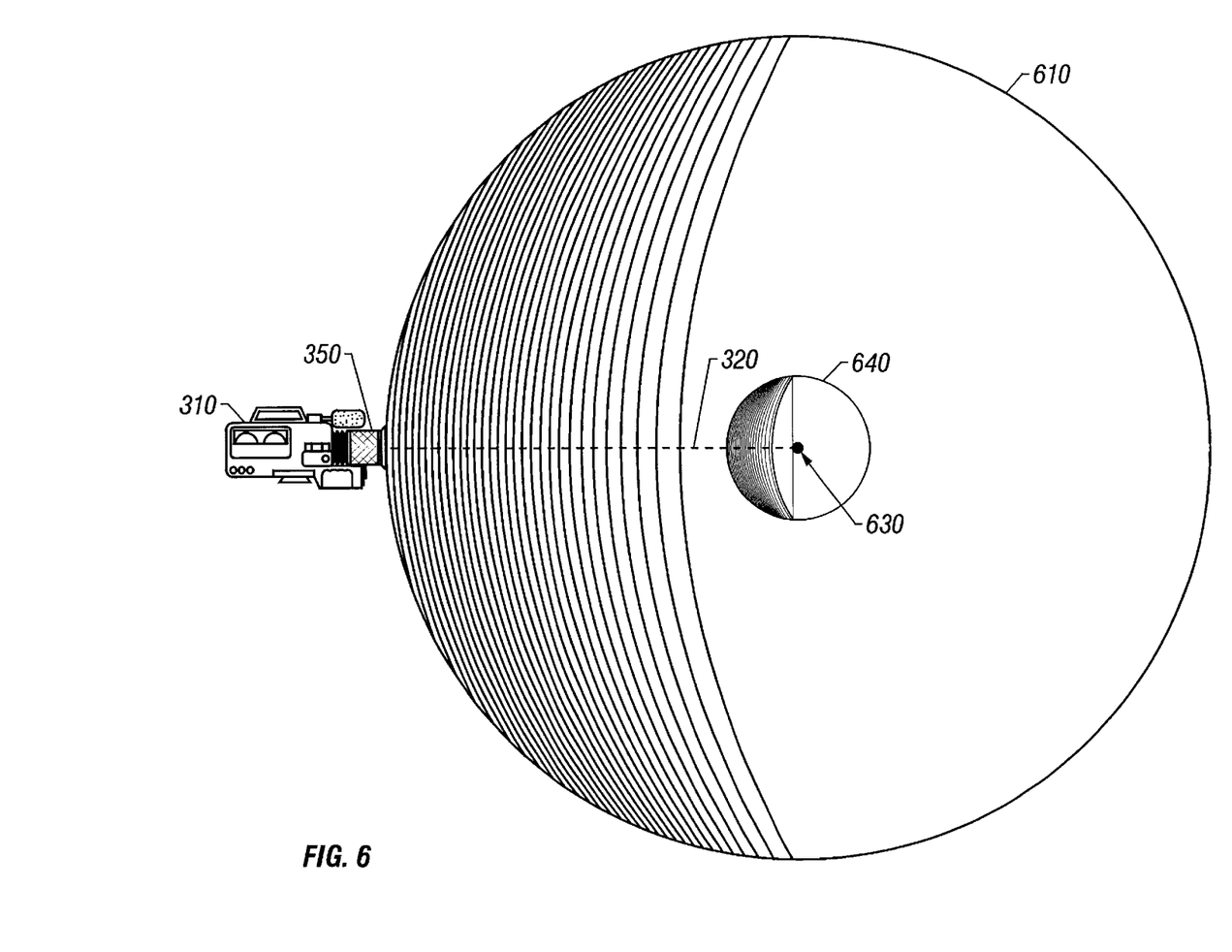
FIG. 6 shows motion of the virtual camera in a spherical manner for providing auto-dynamics of certain three-dimensional graphics scenes in accordance with another embodiment.

Heretofore, movement of the camera 310 has been described as being along the plane 340 for enhancing the depth perception of 3D scenes. However, referring to FIG. 6, a 3D scene may have a center of rotation around a point 630 about which a 3D object 640 rotates. For example, the 3D object 640 may be a three-dimensional representation of the Earth, spinning on its axis at the center of rotation of the 3D scene. In this particular scenario, movement of the camera 310 on the plane 340 would not provide optimal relative depth of the object 640 within the scene. Accordingly, in an alternative embodiment, the camera 310 could move along the outer surface of a virtual sphere 610, as shown in FIG. 6. In this embodiment, the distance "$d_s$" would be determined in a similar fashion as that of the previous embodiment, where the center point 330 of the previous embodiment would be the center of rotation designated by the point 630 of FIG. 6. While moving by the distance "$d_s$", the camera lens 350 would remain orthogonal to the surface of the sphere 610, and, thus, enhance the 3D visualization of the spherical object 640.

While the present invention has been primarily discussed with the movement of the camera 310 on a plane and a virtual sphere, it will be appreciated that movement of the camera 310 could be performed on other virtual objects as well, such as a cylinder, cone, etc. without departing from the spirit and scope of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:

generating a first three-dimensional view of a graphics scene from a first viewing position, said graphics scene including a three-dimensional object;

generating a second three-dimensional view of said graphics scene from a second viewing position;

calculating a first distance utilizing a second distance from a midpoint between said first and second viewing positions to said graphics scene, wherein said second viewing position is offset from said first viewing position by said first distance; and simulating relative motion of said graphics scene utilizing said first and second three-dimensional views to convey a relative depth of said three-dimensinal object within said graphics scene to a user.

2. The method as set forth in claim 1, wherein simulating relative motion of said graphics scene utilizing said first and second three-dimensional views comprises displaying said first three-dimensional view and said second three-dimensional view alternately for a predetermined time.

3. The method as set forth in claim 2, wherein displaying said first three-dimensional view and said second three-dimensional view alternately for a predetermined time comprises oscillating between said first and second three-dimensional views.

4. The method as set forth in claim 1, wherein said second distance is determined as an eye line from said mid-point between said first and second viewing positions to a center of said graphics scene.

5. The method as set forth in claim 4, wherein said first and second viewing positions are obtained along a plane orthogonal to said eye line.

6. The method as set forth in claim 5, wherein said first and second viewing positions are displaced horizontally apart relative to said graphics scene.

7. The method as set forth in claim 5, wherein said first and second viewing positions are displaced vertically apart relative to said graphics scene.

8. The method as set forth in claim 4, wherein said mid-point between said first and second viewing positions to either of said first and second viewing positions is less than 5% of said second distance.

9. The method as set forth in claim 1, wherein said first and second viewing positions are positioned along a spherical surface relative to said graphics scene.

10. An apparatus, comprising:

a processor to generate a first three-dimensional view of a graphics scene from a first viewing position and a second three-dimensional view of said graphics scene from a second viewing position, said graphics scene including a three-dimensional object, and to calculate a first distance utilizing a second distance from a mid-point between said first and second viewing positions to said graphics scene, wherein said second viewing position is offset from said first viewing position by said first distance, and a display coupled to said processor to display said first and second three-dimensional views and in which said processor causes said display to simulate relative motion of said graphics scene utilizing said first and second three-dimensional views to convey a relative depth of said three-dimensional object within said graphics scene to a user.

11. The apparatus as set forth in claim 10, wherein said processor comprises a processor to cause said display to repetitively shift between said first and second three-dimensional views being displayed to simulate relative motion of said graphics scene.

12. The apparatus as set forth in claim 11, wherein said processor further comprises a processor to cause said display to repetitively shift between said first and second three-dimensional views being displayed for a predetermined time period.

13. The apparatus as set forth in claim 10, wherein said processor comprises a processor to determine said second distance as an eye line from said mid-point between said first and second viewing positions to a center of said graphics scene.

14. The apparatus as set forth in claim 13, wherein said processor comprises a processor to determine said first and second viewing positions along a plane orthogonal to said eye line.

15. The apparatus as set forth in claim 14, wherein said processor comprises a processor to cause said display to repetitively shift between said first and second three-dimensional views which are displaced horizontally apart relative to the graphics scene.

16. The apparatus as set forth in claim 14, wherein said processor comprises a processor to cause said display to repetitively shift between said first and second three-dimensional views which are displaced vertically apart relative to the graphics scene.

17. The apparatus as set forth in claim 13, wherein said mid-point between said first and second viewing positions to either of said first and second viewing positions is less than 5% of said second distance.

18. The apparatus as set forth in claim 10, further comprising a user-input device to select programming parameters to generate said first and second three-dimensional views.

19. A program storage device programmed with instructions which, when executed by a computer, cause said computer to perform a method comprising:

generating a first three-dimensional view of a graphics scene from a first viewing position, said graphics scene including a three-dimensional object;

generating a second three-dimensional view of said graphics scene from a second viewing position;

calculating a first distance utilizing a second distance from a midpoint between said first and second viewing positions to said graphics scene, wherein said second viewing position is offset from said first viewing position by said first distance; and simulating relative motion of said graphics scene utilizing said first and second three-dimensional views to convey a relative depth of said three-dimensional object within said graphics scene to a user.

20. The program storage device as set forth in claim 19, wherein simulating relative motion of said graphics scene utilizing said first and second three-dimensional views comprises displaying said first three-dimensional view and said second three-dimensional view alternately for a predetermined time.

21. The program storage device as set forth in claim 20, wherein displaying said first three-dimensional view and said second three-dimensional view alternately for a predetermined time comprises oscillating between said first and second three-dimensional views.

22. The programming storage device as set forth in claim 19, wherein said second distance is determined as an eye line from said mid-point between said first and second viewing positions to a center of said graphics scene.

23. The programming storage device as set forth in claim 22, wherein said first and second viewing positions are obtained along a plane orthogonal to said eye line.

24. The programming storage device as set forth in claim 23, wherein said first and second viewing positions are displaced horizontally apart relative to said graphics scene.

25. The programming storage device as set in claim 23, wherein said first and second viewing positions are displaced vertically apart relative to said graphics scene.

26. The programming storage device as set forth in claim 22, wherein said mid-point between said first and second viewing positions of either of said first and second viewing positions is less than 5% of said second distance.

27. The programming storage device as set forth in claim 19, wherein said first and second viewing positions are positioned along a spherical surface relative to said graphics scene.

* * * * *